US008090469B2

(12) United States Patent
Sutoh

(10) Patent No.: US 8,090,469 B2
(45) Date of Patent: Jan. 3, 2012

(54) PRINTING MEDIUM CONVEYING APPARATUS AND PRINTING MEDIUM CONVEYING METHOD

(75) Inventor: Yasushi Sutoh, Sendai (JP)

(73) Assignee: Ricoh Company, Ltd., Tokyo (JP)

( * ) Notice: Subject to any disclaimer, the term of this patent is extended or adjusted under 35 U.S.C. 154(b) by 1203 days.

(21) Appl. No.: 11/578,726

(22) PCT Filed: Mar. 2, 2006

(86) PCT No.: PCT/JP2006/304529

§ 371 (c)(1), (2), (4) Date: Oct. 18, 2006

(87) PCT Pub. No.: WO2006/098208

PCT Pub. Date: Sep. 21, 2006

(65) Prior Publication Data

US 2009/0219553 A1 Sep. 3, 2009

(30) Foreign Application Priority Data

Mar. 14, 2005 (JP) ................................ 2005-071210
Sep. 13, 2005 (JP) ................................ 2005-265070

(51) Int. Cl.
*G06F 7/00* (2006.01)

(52) U.S. Cl. ...................................................... 700/213

(58) Field of Classification Search .................. 700/213, 700/228, 230

See application file for complete search history.

(56) References Cited

U.S. PATENT DOCUMENTS 4,459,525 A * 7/1984 Hasegawa ..................... 318/561
4,591,969 A * 5/1986 Bloom et al. ................... 700/78
5,502,544 A 3/1996 Carolan
5,731,680 A * 3/1998 Winterberger et al. ....... 318/685
6,418,357 B1 * 7/2002 Chodack et al. .............. 700/220
6,640,157 B2 10/2003 Writt et al.
6,666,324 B2 * 12/2003 Engarto et al. ................ 198/447
7,014,378 B2 * 3/2006 Saito et al. .................... 400/582
2003/0154000 A1 8/2003 Writt et al.
2003/0225484 A1 * 12/2003 Cho et al. ...................... 700/306
2004/0207146 A1 * 10/2004 Engarto et al. ................ 271/184

FOREIGN PATENT DOCUMENTS

| | | |
|---|---|---|
| JP | 05 324085 | 12/1993 |
| JP | 8-95434 | 4/1996 |
| JP | 10 302377 | 11/1998 |
| JP | 2001 169584 | 6/2001 |
| JP | 2001 224189 | 8/2001 |
| JP | 2001 275373 | 10/2001 |
| JP | 2002 233179 | 8/2002 |
| JP | 2002 345277 | 11/2002 |
| JP | 2003 348878 | 12/2003 |

* cited by examiner

*Primary Examiner* — Ramya Prakasam

(74) *Attorney, Agent, or Firm* — Oblon, Spivak, McClelland, Maier & Neustadt, L.L.P.

(57) ABSTRACT

A printing medium conveying technique is disclosed for moving a printing medium in a sub scanning direction. The technique involves controlling the moving of the printing medium through feedback control using a speed profile. The speed profile includes an accelerating region, a constant speed region, a decelerating region, a constant low speed region, and a stopping operations region. The technique also involves switching the speed profile from the accelerating region to the constant speed region according to speed information; and switching the speed profile between the constant speed region, the decelerating region, the constant low speed region, and the stopping operations region according to the current distance from a target position.

18 Claims, 8 Drawing Sheets

PRINTING MEDIUM CONVEYING APPARATUS AND PRINTING MEDIUM CONVEYING METHOD

TECHNICAL FIELD

The present invention relates to a printing medium conveying apparatus and printing medium conveying method implemented in an imaging apparatus such as an inkjet printer. More specifically, the present invention relates to a motor controlling method, a motor controlling apparatus, a printer using such motor controlling method and apparatus, and a computer program and a computer system for realizing such motor controlling method and apparatus.

BACKGROUND ART

A system for realizing positioning operations through speed feedback control using a speed profile is widely used in a printing medium conveying apparatus of an inkjet printer and other applications related to other technical fields. However, in a case where positioning operations are performed based on a speed profile, when deviations occur with respect to the speed profile, variations may be created with respect to the actual distance traveled. Also, a substantial deviation with respect to the speed profile may result in substantial undershoot and overshoot to thereby cause oscillation and instability in the positioning operations.

It is noted that motor drive controlling techniques using a speed profile are disclosed in Japanese Laid-Open Patent Publication No. 2001-224189, Japanese Laid-Open Patent Publication No. 2001-169584, and Japanese Laid-Open Patent Publication No. 2003-348878, for example.

In the case of controlling a motor through a motor controlling scheme using a speed profile, when the drive load of the motor is not considered upon driving the motor to achieve a certain target profile, the time required for the motor to reach a predetermined rotation speed may vary depending on the drive load of the motor. Specifically, when the drive load of the motor is relatively light, the motor may reach the predetermined rotation speed in a relatively short period of time; on the other hand, when the drive load of the motor is heavy, a relatively long period of time may be required for the motor to reach the predetermined rotation speed.

DISCLOSURE OF THE INVENTION

According to an aspect of the present invention, a motor controlling method is provided for accurately controlling a motor even when the drive load of the motor fluctuates and enabling the motor to reach a target position in a relatively short period of time. According to another aspect of the present invention, a motor controlling apparatus that is capable of executing such a motor controlling method is provided. According to another aspect of the present invention, a computer program contained in a computer-readable medium that is executed by a computer to perform such a motor controlling method is provided.

According to one specific embodiment of the present invention, a printing medium conveying apparatus that is configured to move a printing medium in a sub scanning direction is provided, the apparatus including:

a control unit that includes a speed profile and is configured to control the moving of the printing medium through feedback control using the speed profile;

wherein the speed profile includes an accelerating region, a constant speed region, a decelerating region, a constant low speed region, and a stopping operations region;

the speed profile is switched from the accelerating region to the constant speed region according to speed information; and the speed profile is switched between the constant speed region, the decelerating region, the constant low speed region, and the stopping operations region according to a current distance from a target position.

According to another specific embodiment of the present invention, a printing medium conveying method for moving a printing medium in a sub scanning direction is provided, the method comprising the steps of:

controlling the moving of the printing medium through feedback control using a speed profile, which speed profile includes an accelerating region, a constant speed region, a decelerating region, a constant low speed region, and a stopping operations region;

switching the speed profile from the accelerating region to the constant speed region according to speed information; and switching the speed profile between the constant speed region, the decelerating region, the constant low speed region, and the stopping operations region according to a current distance from a target position.

According to another specific embodiment of the present invention, a computer-readable medium containing a printing medium conveying program run on a computer for moving a printing medium in a sub scanning direction is provided, the program being executed by the computer to perform the printing medium conveying method according to an embodiment of the present invention.

In a preferred embodiment of the present invention, a profile of the decelerating region is determined by a function of the current distance from the target position.

In another preferred embodiment of the present invention, a target speed for decelerating from a first speed V1 to a second speed V2 in the decelerating region is determined by a function of an encoder pulse count value Pr, which function is expressed as:

$$Vt=(Pr\times(V1-V2)/(P1-P2)-(P1\times(V1-V2)/(P1-P2)-V1))/(Lp)$$

wherein P1 denotes a count value at the first speed V1, P2 denotes a count value at the second speed V2, and Lp denotes an encoder pulse resolution.

According to an aspect of the present invention, in switching a speed profile to control the moving and stopping of a printing medium, by determining the speed profile based on the current distance from a target position (i.e., the difference between a target stopping position count value corresponding to the number of edges of an encoder pulse to be counted from the start of the moving operation and the current position count value) particularly in a decelerating region of the speed profile, the amount of deceleration may be reduced as the current position comes closer to the target position so that the change in the target speed upon switching from the decelerating region to a constant low speed region may be reduced and deviations in speed may be prevented upon shifting to a constant speed phase after deceleration.

According to another aspect of the present invention, since the speed is determined based on a difference with respect to a target value, a target speed in the vicinity of a target position may be reduced to a low speed so that deviations may be prevented and stable stopping operations may be realized.

BRIEF DESCRIPTION OF THE DRAWINGS

Other objects, features and advantages of the present invention will become more apparent from the following detailed description when read in conjunction with the accompanying drawings.

BEST MODE FOR CARRYING OUT THE INVENTION

In the following, preferred embodiments of the present invention are described with reference to the accompanying drawings.

In the case of controlling a motor by starting a rotating operation of the motor in response to a motor drive start signal, and setting a target angle or a target distance for the rotation angle of the motor, the peripheral traveling distance of a drive roller arranged in the motor, or the traveling distance of a belt arranged in the drive roller, for example, the motor may be driven to a target position through detecting the rotation degree or the traveled distance of the motor by an encoder arranged at a drive shaft of the motor or a driven shaft that is driven by the motor via a decelerating mechanism, for example, and feeding back an amount of change in the rotation degree or the traveled distance to the motor.

Figure 1:
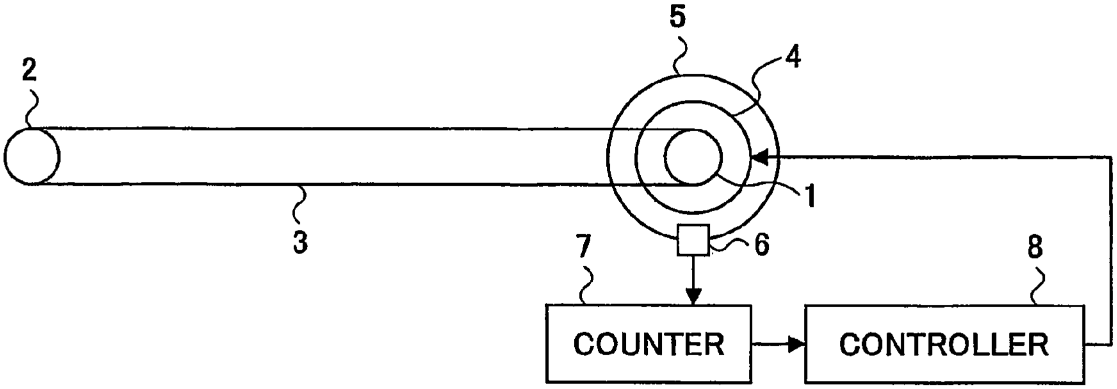
FIG. 1 is a diagram showing a configuration of a printing medium conveying apparatus according to an embodiment of the present invention.

FIG. 1 is a diagram showing a configuration of a printing medium conveying apparatus according to an embodiment of the present invention. As is shown in this drawing, the printing medium conveying apparatus of the present embodiment includes a drive pulley 1, a driven pulley 2, a belt arranged over the drive pulley 1 and the driven pulley 2, a motor 4 that is configured to rotate a shaft of the drive pulley 1 to rotate the belt 3, an encoder 5 that is arranged coaxially with respect to the drive pulley 1, an encoder sensor 6 that is configured to detect a slit formed on the encoder 5, a counter 7 that is configured to count the outputs of the encoder sensor 6 to calculate the degree of rotation of the drive pulley 1, and a controller 8 that is configured to control the motor 4 to rotate to a target position based on the degree of rotation of the drive pulley 1 calculated by the counter 7.

Figure 2:
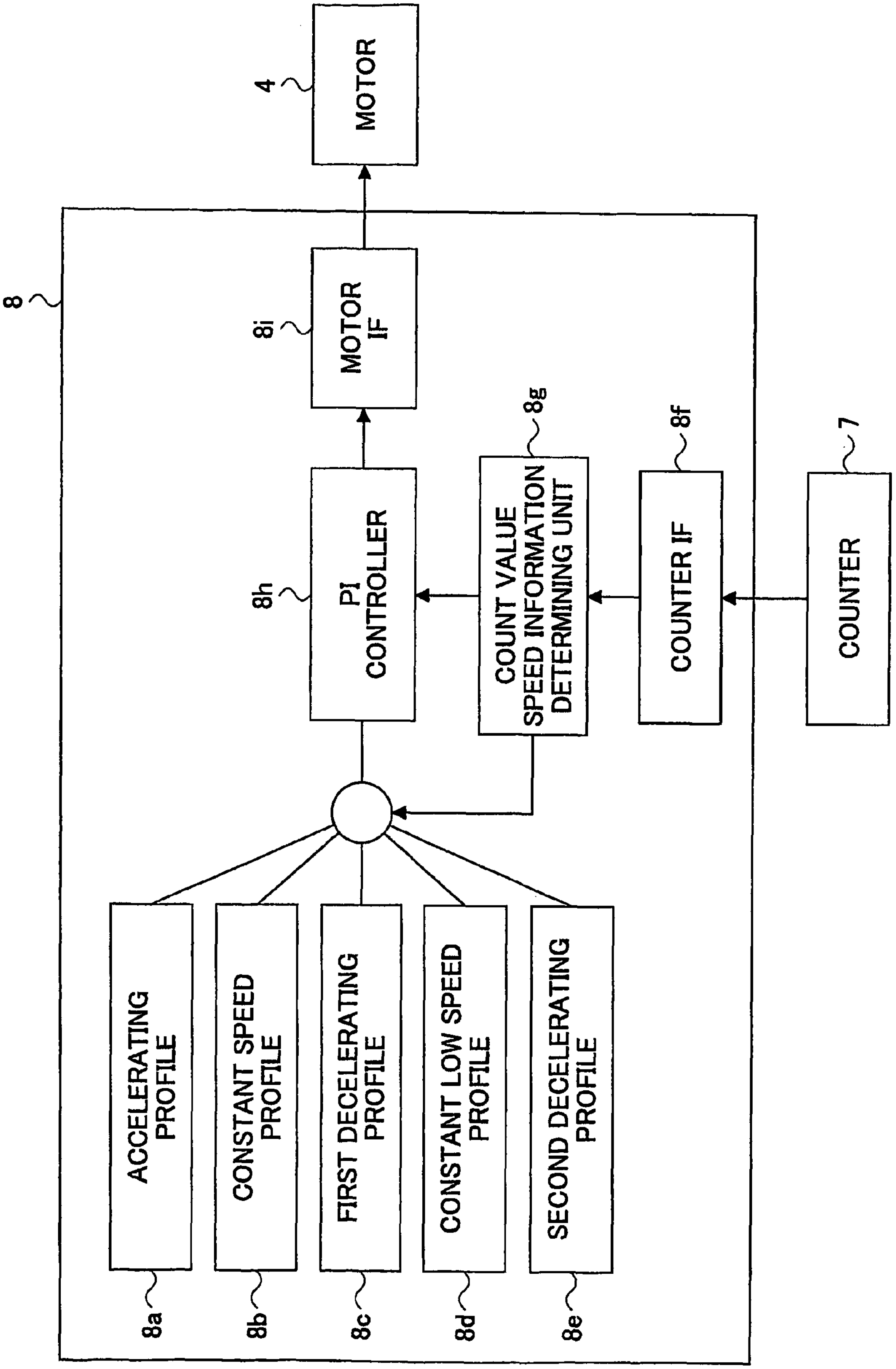
FIG. 2 is a diagram showing an exemplary configuration of a controller of the printing medium conveying apparatus of the present embodiment.
Figure 3:
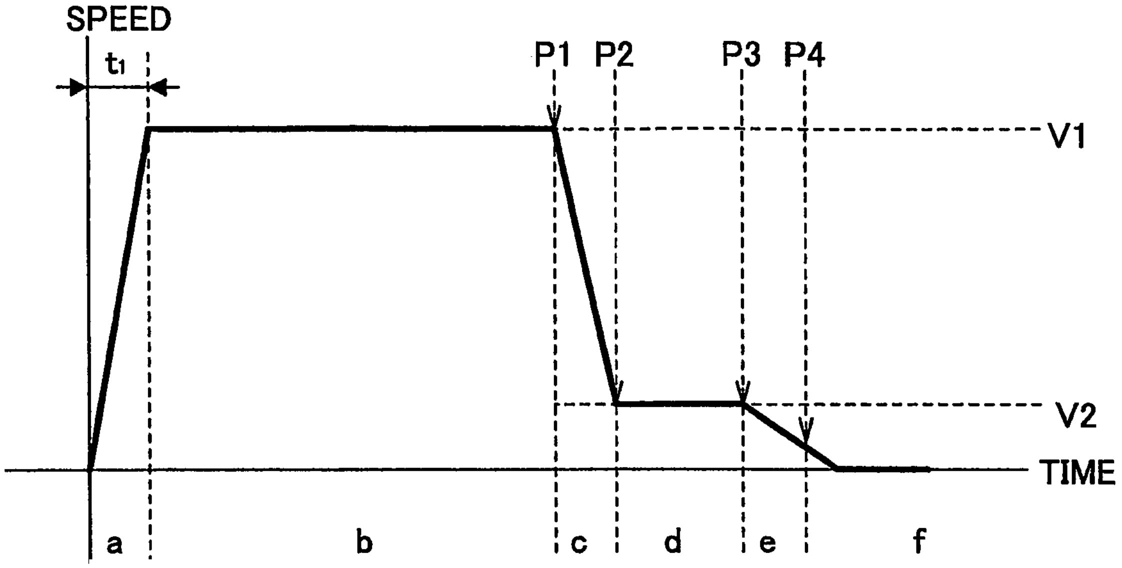
FIG. 3 is a graph illustrating a speed profile used in an embodiment of the present invention.

FIG. 2 is a block diagram showing an exemplary configuration of the controller 8 of the printing medium conveying apparatus of the present embodiment. FIG. 3 is a graph illustrating an exemplary speed profile.

According to the present example, the controller 8 is configured to control the speed of the motor 4 by controlling switching between an accelerating profile 8*a*, a constant speed profile 8*b*, a first decelerating profile 8*c*, a constant low speed profile 8*d*, and a second decelerating profile 8*e* according to conditions for switching from an accelerating region (a), to a constant speed region (b), a first decelerating region (c), a constant low speed region (d), and a second decelerating region (e) of the speed profile shown in FIG. 3. It is noted that in a stopping operations region (f) of FIG. 3, final positioning control may be performed without using a speed profile.

According to the present example, a count value speed information determining unit 8*g* is configured to execute switching between the profiles 8*a*-8*e* based on the degree of rotation of the drive pulley 1 obtained from the counter 7 via an interface 8*f*. In the present example, profile switching based on a count value is realized by determining whether to perform switching based on the relevant count value, and determining speed information based on the sampling period of count data in the count value speed information determining unit 8*g* and a difference value of the count value.

According to the present example, the belt 3 may be moved to a target position by obtaining a corresponding target position for each speed profile, calculating the drive torque of the motor 4 according to its speed by a PI (proportional-integral) controller 8*h*, and rotating the motor 4 via a motor interface 8*i*.

Figure 4:
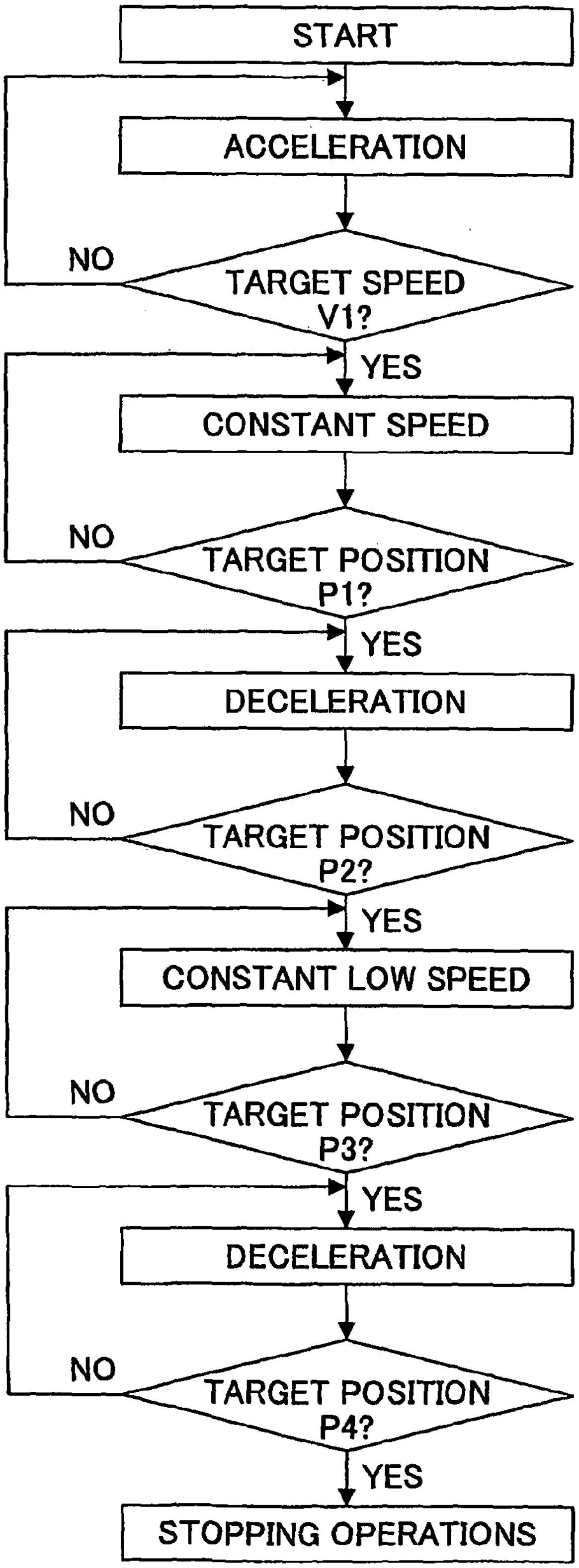
FIG. 4 is a flowchart illustrating a process flow for switching the speed profile of FIG. 3.

FIG. 4 is a flowchart illustrating an exemplary flow of a profile switching process based on the speed profile shown in FIG. 3 which profile switching process may be implemented to position the belt 3 to a target position, for example. As is described above, the speed profile of FIG. 3 includes the accelerating region (a) for accelerating the speed to a predetermined speed from the start of motor rotation, the constant speed region (b) for maintaining the speed at a constant speed, the first decelerating region (c) for decelerating the speed from the constant speed to a predetermined low speed, the constant low speed region (d) for maintaining the speed at the predetermined low speed, the second decelerating region (e) for decelerating the speed once more before stopping at a target area, and the stopping operations region (f) for performing stopping operations for stopping at the target position.

According to the present example, given that the speed in the constant speed region (b) is denoted as V1, the speed V1 is set as a target speed in the accelerating region (a). It is noted that a speed V0 in the accelerating region (a) may be calculated from the number of pulses within a sampling period obtained by the rotation of the encoder 5. Given that the number of pulses within the sampling period is denoted as Pc, the sampling period is denoted as Ts, and the resolution of the encoder pulse (based on rotation of the drive shaft) is denoted as Lp, the speed V0 may be calculated based on the following formula:

$$V0 = Pc \times Lp / Ts$$

It is noted that speed control is performed in the accelerating region (a) with the target speed set to V1 until the condition V0=V1 is satisfied. Switching from the accelerating region (a) to the constant speed region (b) is performed when the condition V0=V1 is satisfied.

In the constant speed region (b), speed control is performed with the target speed set to V1.

It is noted that switching from the constant speed region (b) to the decelerating region (c) is determined based on a difference between a target position (target count value of encoder pulse counted from the start) and a current count value counted from the start. That is, given that the target count value is denoted as Pt, the current count value is denoted as Pr, an a corresponding target position for the constant speed region (b) is denoted as P1, switching from the constant speed region (b) to the decelerating region (c) is performed when the following condition is satisfied:

$$P1=Pt-Pr$$

In the decelerating region (c), deceleration from the speed V1 to a speed V2 is realized. In this case, a target speed Vt in the decelerating region (c) may be calculated from a function of the encoder pulse number count value Pr as is expressed below:

$$Vt=(Pr\times(V1-V2)/(P1-P2)-(P1\times(V1-V2)/(P1-P2)-V1))/(Lp)$$

It is noted that P1 denotes a value obtained by subtracting the current count value from the target count value for switching from the constant speed region (b) to the decelerating region (c), P2 denotes a value obtained by subtracting the current count value from a target count value for switching from the decelerating region (c) to the constant low speed region (d), and Lp denotes the resolution of the encoder pulse (based on rotation of the drive shaft).

Given that the target count value is denoted as Pt, and the current count value is denoted as Pr, switching from the decelerating region (c) to the constant low speed region (d) is performed when the following condition is satisfied:

$$P2=Pt-Pr$$

In the decelerating region (d), speed control is performed with the target speed set to V2.

It is noted that switching from the constant low speed region (d) to the decelerating region (e) is determined based on a difference between a target position (target count value of encoder pulse counted from the start) and a current count value counted from the start. That is, given that the target count value is denoted as Pt, the current count value is denoted as Pr, and a corresponding target position for the constant low speed region (d) is denoted as P3, switching from the constant low speed region (d) to the decelerating region (e) is performed when the following condition is satisfied:

$$P3=Pt-Pr$$

In the decelerating region (e), the speed is decelerated from the speed V2 to a near halt. In this case, a target speed Vt in the decelerating region (e) may be calculated from a function of the encoder pulse number count value Pr as is expressed below:

$$Vt=(Pr\times(V2)/(P3)-(P1\times(V2)/(P3)))/(Lp)$$

It is noted that P3 denotes a value obtained by subtracting the current count value from the target count value for switching from the constant low speed region (d) to the decelerating region (e), and Lp denotes the resolution of the encoder pulse (based on rotation of the drive shaft).

Switching from the decelerating region (e) to the stopping operations region (f) is determined based on the difference between a target position (target count value of encoder pulse counted from the start) and the current count value counted from the start. Given that the target value is denoted as Pt, the current count number is denoted as Pr, and a corresponding target position for the decelerating region (e) is denoted as P4, switching from the decelerating region (e) to the stopping operations region (f) is performed when the following condition is satisfied:

$$P4=Pt-Pr$$

In the stopping operations region (f), positioning operations such as position feedback control and adjustment of a motor drive command value based on the difference between the target position and the current count number in open loop are performed to realize positioning at the target position.

As can be appreciated from the above descriptions, according to the present example, positioning to a target position may be realized by determining a target speed value for each speed profile (region) and switching the target speed value based on the encoder pulse count value.

It is noted that a speed profile used in an embodiment of the present invention does not necessarily have to include the second decelerating region (e) and the stopping operations region (f) included in the speed profile shown in FIG. 3. For example, the motor control operations may be arranged to move on to stopping operations from an operations state corresponding to the constant low speed region (d) based on a difference value with respect to the target position.

Figure 5:
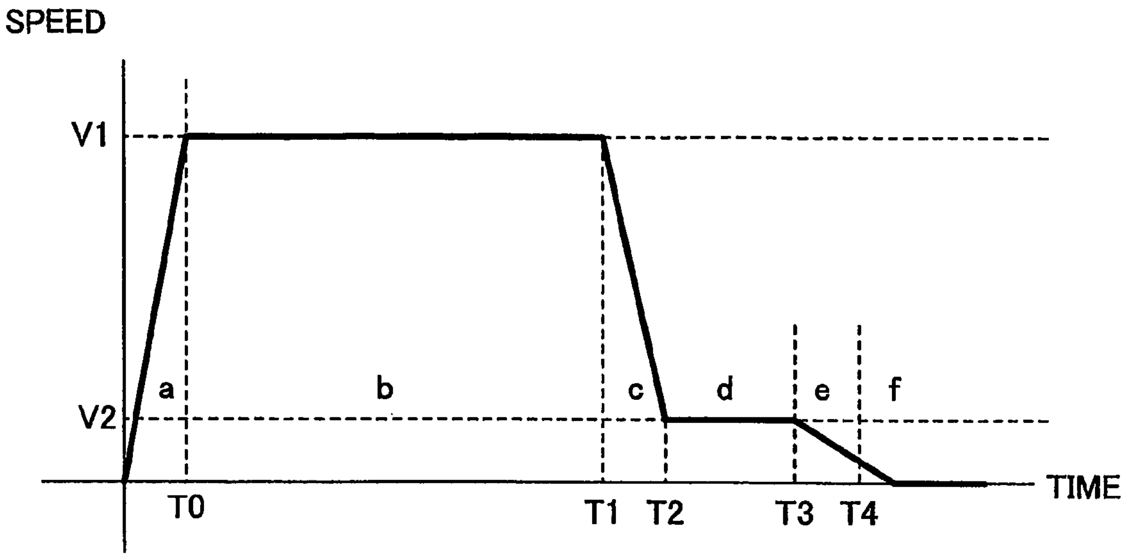
FIG. 5 is a graph illustrating another speed profile as a comparison example.

Also, it is noted that by using the speed profile as is described above to perform positioning control, stable stopping operations may be realized even when fluctuation occurs in the load of the drive shaft and the decelerating state of the drive shaft is changed as a result, for example, FIG. 5 is a graph illustrating another speed profile as a comparison example. According to this comparison example, the speed profile is configured to control speed based on time (referred to as 'time-speed profile' hereinafter). The speed profile of FIG. 5 is generated as a profile with the vertical axis representing the speed and the horizontal axis representing the time and includes regions (a) through (f) that are defined by time. Specifically, in region (a) from the start time to time T0, the speed is accelerated to speed V1; in region (b) from time T0 to time T1, the speed is maintained constant at V1; in region (c) from time T1 to time T2, the speed is decelerated from V1 to V2; in region (d) from time T2 to time T3, the speed is maintained constant at V2; in region (e) from time T3 to T4, the speed is decelerated from V2 to a near halt; and in region (f), stopping control is performed to realize positioning to the target position.

According to the present example, a speed profile with respect to a relevant mechanism may be generated through simulation provided that the characteristics of the relevant mechanism are known and the load conditions are substantially fixed, and test operations may be performed using the generated speed profile to obtain a suitable speed profile for the relevant mechanism. However, in the present example changes in speed characteristics owing to variations in the load conditions may not be tolerated, for example, and in such a case, the movement of the drive shaft of the drive pulley 1 may not be in conformity with the speed profile of FIG. 5.

Figure 6:
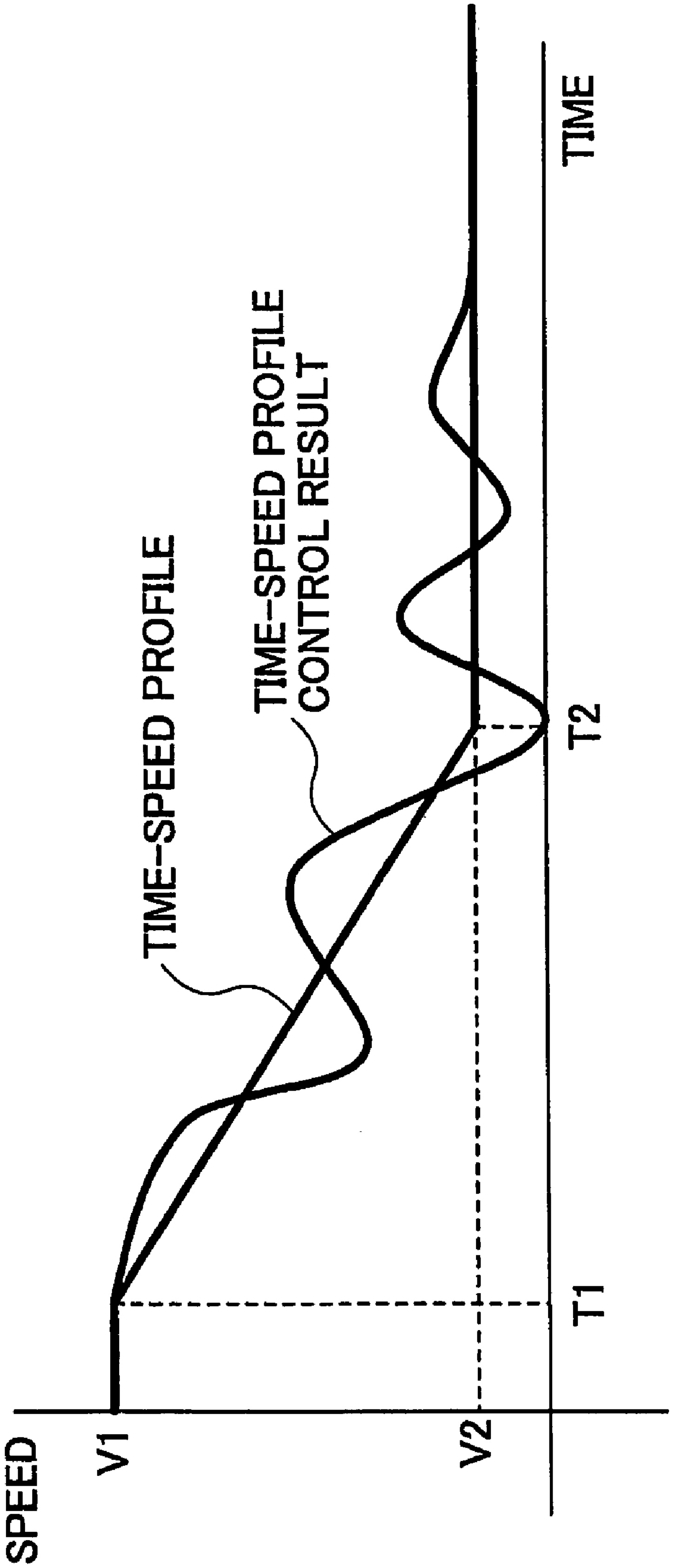
FIG. 6 is a graph illustrating an exemplary configuration of a decelerating region of the speed profile of FIG. 5.

Particularly, with respect to the decelerating region (c), when a speed profile based on time is used and the load of the relevant mechanism is different from the expected value, deviations may occur with respect to the speed profile in the decelerating region (c) as is illustrated in FIG. 6. Also, deceleration and acceleration may be repeated even in the subsequent constant speed region (d) in an attempt to comply with the speed profile (to reach the target speed), and thereby substantial speed fluctuations may be generated. As a result, the required time for reaching the target position may be increased.

Also, it is noted that in a case where the relevant mechanism is not provided with adequate rigidity, the relevant mechanism may be a vibrating system and when the mechanism resonance frequency is low, an oscillating state may be created.

Further, since the speed is controlled by time according to the present example, when the speed is not adequately decelerated with respect to the target position, the time during which a motor is driven at a speed higher than the relevant target speed may be longer, and thereby, the actual distance traveled may be increased and the motor may be driven past the target position to thereby cause oscillation, for example.

According to an embodiment of the present invention, a speed profile is generated according to a target position using the formulae described above in which position and speed are arranged to have a linear relationship (position-speed profile: speed profile based on the distance from the target position). In this case, the speed profile is configured so that the target speed is decreased upon nearing the target position, and in turn, the speed controlled by the speed profile is decreased upon nearing the target position. Accordingly, the amount of positional change is reduced and the change in the target speed of the speed profile is reduced in such a case. Specifically, referring to FIG. 7 which illustrates an exemplary configuration of the decelerating region (c) of the position-speed profile, when deceleration is just started, the amount of movement per time unit is relatively large since the speed is still relatively high and the amount of change in the speed profile (target speed) is relatively large. As the distance with respect to the target position is reduced, and deceleration progresses, the amount of movement per time unit is reduced and the amount of change in the target speed is reduced. According to the present embodiment, even when the target speed is set to a low speed, the amount of deceleration is controlled upon nearing the target position to then move to a constant speed profile so that the actual speed may be prevented from oscillating with respect to the target speed.

Figure 7:
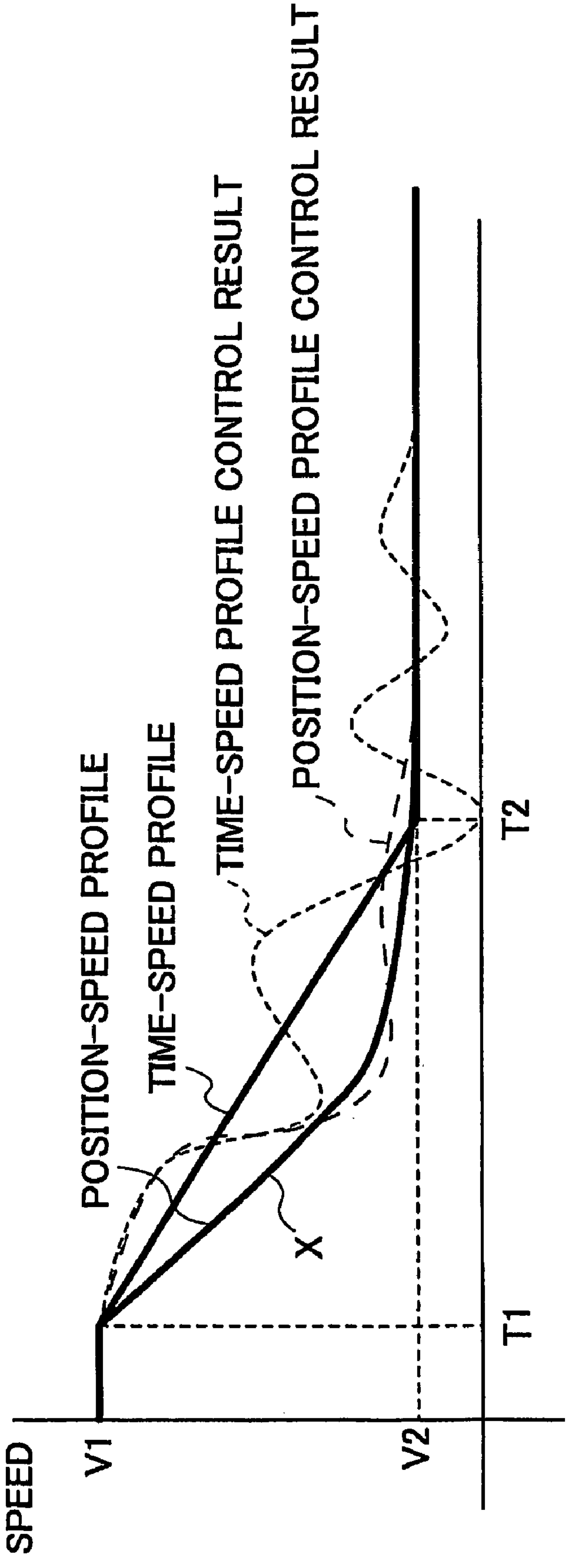
FIG. 7 is a graph illustrating a configuration of a decelerating region of the speed profile of FIG. 3.

As is shown in FIG. 7, in the case where a speed profile based on time (time-speed profile) is used, the actual amount of deceleration is increased when there is a large difference between the actual speed and the target speed, and the actual speed is prone to oscillate as a result. However, in the case of using a speed profile based on position (position-speed profile) as in the present embodiment, the amount of deceleration of the speed profile is determined based on the distance from the target position as is represented by line X in FIG. 7, and thereby, a large-scale oscillation of the actual speed may be prevented.

Figure 8:
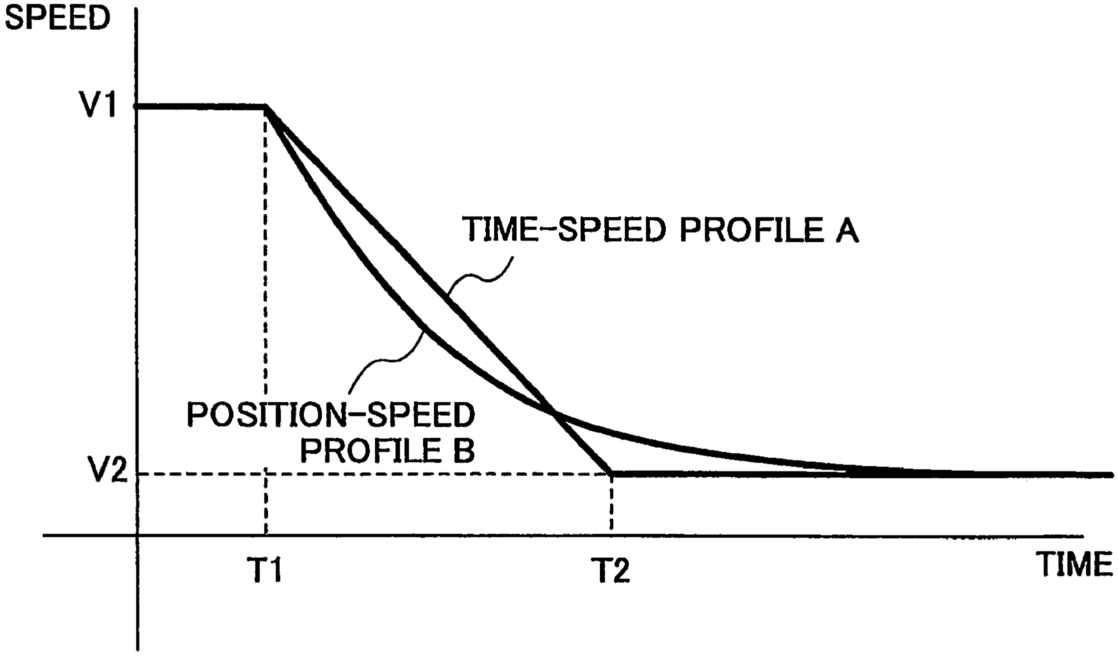
FIG. 8 is a graph illustrating a difference between the speed profile of FIG. 3 and the speed profile of FIG. 5.

FIG. 8 is a graph illustrating target speeds according to a time-speed profile and a position-speed profile obtained using a time function for a case in which the speed changes at a constant rate (with respect to time or position). By comparing the time-speed profile (A) and the position-speed profile (B) illustrated in this drawing, it can be appreciated that in the position-speed profile (B), the amount of deceleration is arranged to be relatively large at the start of deceleration since the speed is still relatively high at this point, and the amount of speed change (deceleration) is arranged to be small near the end of deceleration since the speed is decreased and the traveled distance is reduced. In other words, when the position-speed profile (B) is viewed as a graph with the horizontal axis representing the time as in FIG. 8, it can be appreciated that the amount of speed change is reduced near the end of deceleration, and thereby, target speeds may be gradually changed to the constant low speed V2.

It is noted that at point T2 in FIG. 8, an abrupt change in speed occurs in the time-speed profile (A). However, according to the position-speed profile (B), which is based on one or more functions representing a linear relationship between the position and speed, in the case of realizing deceleration to a predetermined speed (V2) within the same time period (T1-T2), the deceleration amount is arranged to be large at the start of deceleration whereas the speed change is slowed down towards the end of deceleration that moves on to a constant speed region, and thereby, oscillation of the actual speed may be prevented by using this profile. This is based on the fact that by obtaining target speeds based on position, speed change may be reduced when the speed is relatively slow since the amount of movement is reduced and the amount of change in position is reduced.

It is noted that embodiments within the scope of the present invention include a printing medium conveying apparatus, a printing medium conveying method, and a printing medium conveying program contained in a computer readable-medium. The printing medium conveying program may be contained in any computer-readable medium for carrying or having computer-executable instructions or data structures stored thereon. Such a computer-readable medium can be any available medium which can be accessed by a general purpose or a special purpose computer. By way of example, and not limitation, such a computer-readable medium can comprise a physical storage medium such as a RAM, a ROM, an EEPROM, a CD-ROM, other optical disk storage devices, other magnetic storage devices, or any other medium which can be used to carry or store desired program code means in the form of computer-executable instructions or data structures and which can be accessed by a general purpose or special purpose computer. Such a medium may include a wireless carrier signal, for example. When information is transferred or provided over a network or other communications connection (either hardwired, wireless, or combinations thereof) to a computer, the computer properly views the connection as a computer-readable medium. Thus, any such connection is properly termed a computer-readable medium. Combinations of the above should also be included within the scope of the computer-readable medium. Computer-executable instructions comprise, for example, instructions and data which cause a general purpose computer, a special purpose computer, or a processing device to perform a certain function or a group of functions.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2005-071210 filed on Mar. 14, 2005, and Japanese Patent Application No. 2005-265070 filed on Sep. 13, 2005, the entire contents of which are hereby incorporated by reference.

The invention claimed is:

1. A printing medium conveying apparatus that is configured to move a printing medium in a sub scanning direction, the apparatus comprising:

- a drive pulley including a rotatable shaft;
- a belt arranged over the drive pulley and configured to rotate in correspondence with a rotation of the rotatable shaft;
- a motor configured to move the printing medium by rotating the rotatable shaft; and
- a control unit that includes a speed profile and is configured to calculate the rotation of the rotatable shaft and control the moving of the printing medium through feedback control using the speed profile;
- wherein the speed profile includes an accelerating region, a constant speed region, a decelerating region, a constant low speed region, and a stopping operations region;

the speed profile is switched from the accelerating region to the constant speed region according to speed information; and the speed profile is switched between the constant speed region, the decelerating region, the constant low speed region, and the stopping operations region when a current position of the motor reaches a predetermined distance from a target position.

2. The printing medium conveying apparatus as claimed in claim 1, wherein a profile of the decelerating region is determined by a linear function of a difference of the current position of the motor and the target position, and a speed according to said profile is arranged to decrease as the current position comes closer to the target position.

3. The printing medium conveying apparatus as claimed in claim 2, wherein a target speed for decelerating from a first speed V1 to a second speed V2 in the decelerating region is determined by a function of an encoder pulse count value Pr which function is expressed as:

$$Vt=(Pr\times(V1-V2)/(P1-P2)-(P1\times(V1-V2)/(P1-P2)-V1))/(Lp)$$

wherein P1 denotes a count value at the first speed V1, P2 denotes a count value at the second speed V2, and Lp denotes an encoder pulse resolution.

4. A printing medium conveying method for moving a printing medium in a sub scanning direction via a motor, the method comprising:

arranging a belt over a drive pulley, the drive pulley including a rotatable shaft;

rotating the belt arranged over the drive pulley in correspondence with a rotation of the rotatable shaft to generate the moving of the printing medium;

calculating the rotation of the rotatable shaft;

controlling the moving of the printing medium through feedback control using a speed profile, which speed profile includes an accelerating region, a constant speed region, a decelerating region, a constant low speed region, and a stopping operations region;

switching the speed profile from the accelerating region to the constant speed region according to speed information; and switching the speed profile between the constant speed region, the decelerating region, the constant low speed region, and the stopping operations region when a current position of the motor reaches a predetermined distance from a target position.

5. The printing medium conveying method as claimed in claim 4, wherein a profile of the decelerating region is determined by a linear function of a difference of the current position of the motor and the target position, and a speed according to said profile is arranged to decrease as the current position comes closer to the target position.

6. The printing medium conveying method as claimed in claim 5, wherein a target speed for decelerating from a first speed V1 to a second speed V2 in the decelerating region is determined by a function of an encoder pulse count value Pr, which function is expressed as:

$$Vt=(Pr\times(V1-V2)/(P1-P2)-(P1\times(V1-V2)/(P1-P2)-V1))/(Lp)$$

wherein P1 denotes a count value at the first speed V1, P2 denotes a count value at the second speed V2, and Lp denotes an encoder pulse resolution.

7. A computer-readable medium containing a printing medium conveying program run on a computer for moving a printing medium in a sub scanning direction via a motor, the program being executed by the computer to perform a method, comprising:

arranging a belt over a drive pulley, the drive pulley including a rotatable shaft;

rotating the belt arranged over the drive pulley in correspondence with a rotation of the rotatable shaft to generate the moving of the printing medium;

calculating the rotation of the rotatable shaft;

controlling the moving of the printing medium through feedback control using a speed profile, which speed profile includes an accelerating region, a constant speed region, a decelerating region, a constant low speed region, and a stopping operations region;

switching the speed profile from the accelerating region to the constant speed region according to speed information; and switching the speed profile between the constant speed region, the decelerating region, the constant low speed region, and the stopping operations region when a current position of the motor reaches a predetermined distance from a target position.

8. The printing medium conveying program as claimed in claim 7, wherein a profile of the decelerating region is determined by a linear function of a difference of the current position of the motor and the target position, and a speed according to said profile is arranged to decrease as the current position comes closer to the target position.

9. The printing medium conveying program as claimed in claim 8, wherein a target speed for decelerating from a first speed V1 to a second speed V2 in the decelerating region is determined by a function of an encoder pulse count value Pr, which function is expressed as:

$$Vt=(Pr\times(V1-V2)/(P1-P2)-(P1\times(V1-V2)/(P1-P2)-V1))/(Lp)$$

wherein P1 denotes a count value at the first speed V1, P2 denotes a count value at the second speed V2, and Lp denotes an encoder pulse resolution.

10. The printing medium conveying apparatus as claimed in claim 1, further comprising:

an encoder configured to count a number of revolutions of the motor to determine the current position of the motor.

11. The printing medium conveying apparatus as claimed in claim 1, wherein the target position is a position of the motor at which the motor stops rotating in the stopping operations region.

12. The printing medium conveying method as claimed in claim 4, further comprising:

counting a number of revolutions of the motor to determine the current position of the motor.

13. The printing medium conveying method as claimed in claim 4, wherein the target position is a position of the motor at which the motor stops rotating in the stopping operations region.

14. The printing medium conveying program as claimed in claim 7, further comprising:

counting a number of revolutions of the motor to determine the current position of the motor.

15. The printing medium conveying program as claimed in claim 7, wherein the target position is a position of the motor at which the motor stops rotating in the stopping operations region.

16. The printing medium conveying apparatus as claimed in claim 1, further comprising:

an encoder arranged coaxially with the drive pulley; and an encoder sensor configured to detect a slit formed on the encoder, wherein the control unit calculates the rotation of the rotatable shaft by counting a number of outputs of the encoder sensor.

17. The printing medium conveying method as claimed in claim 4, further comprising:

arranging an encoder coaxially with the drive pulley; and detecting a slit formed on the encoder with an encoder sensor, wherein the calculating the rotation of the rotatable shaft includes counting a number of outputs of the encoder sensor.

18. The printing medium conveying program as claimed in claim 7, further comprising:

arranging an encoder coaxially with the drive pulley; and detecting a slit formed on the encoder with an encoder sensor, wherein the calculating the rotation of the rotatable shaft includes counting a number of outputs of the encoder sensor.

* * * * *

UNITED STATES PATENT AND TRADEMARK OFFICE

CERTIFICATE OF CORRECTION

PATENT NO. : 8,090,469 B2
APPLICATION NO. : 11/578726
DATED : January 3, 2012
INVENTOR(S) : Yasushi Sutoh It is certified that error appears in the above-identified patent and that said Letters Patent is hereby corrected as shown below:

Title page, Item 75, the Inventor's city of Residence is incorrect. Item 75 should read:

--(75) Inventor: Yasushi Sutoh, Miyagi (JP)--

Signed and Sealed this
Thirteenth Day of November, 2012

David J. Kappos
*Director of the United States Patent and Trademark Office*